United States Patent [19]

Kuno et al.

[11] Patent Number: 4,664,867
[45] Date of Patent: May 12, 1987

[54] TOROIDAL COIL APPARATUS

[75] Inventors: Kazuo Kuno, Kobe; Tadashi Ichihara, Takarazuka; Shintaro Fukumoto; Daisaburo Nagata, both of Kobe, all of Japan

[73] Assignee: Mitsubishi Denki Kabushiki Kaisha, Tokyo, Japan

[21] Appl. No.: 618,364

[22] Filed: Jun. 7, 1984

[30] Foreign Application Priority Data

Jun. 18, 1983 [JP] Japan ................. 58-109611

[51] Int. Cl.$^4$ ................................ G21B 1/00
[52] U.S. Cl. ...................... 376/142; 335/299
[58] Field of Search ............... 376/142; 335/282, 299; 336/199

[56] References Cited

U.S. PATENT DOCUMENTS 3,736,539 5/1973 File et al. ................... 376/142
4,174,254 11/1979 Gaines ........................ 376/142
4,287,022 9/1981 Penfield, Jr. ................ 336/199

FOREIGN PATENT DOCUMENTS 72993 6/1978 Japan .................... 376/142
54-48315 4/1979 Japan .

OTHER PUBLICATIONS

D. Knutson et al., PDX, Mechanical Design Update and Assembly, Proceedings of the Seventh Symposium on Engineering Problems of Fusion Research, vol. I, Oct. 25-28, 1977.

Primary Examiner—Deborah L. Kyle
Assistant Examiner—Richard L. Klein
Attorney, Agent, or Firm—Wenderoth, Lind & Ponack

[57] ABSTRACT

A toroidal coil apparatus which includes a plurality of coil support frames which contain coils and which are radially arranged with wedge surfaces of wedge-like coupling portions juxtaposed to each other at the inner end portions thereof, flanges formed along straight portions of said support frames inside the torus, bands that engage across a predetermined number of said flanges to fasten said support frames which are neighboring to one another, thereby to constitute blocks; and coupling members which are arranged inside the torus and which firmly couple the blocks together.

5 Claims, 9 Drawing Figures

TOROIDAL COIL APPARATUS

BACKGROUND OF THE INVENTION

The present invention relates to a torus-type apparatus for nuclear fusion. More specifically, the invention relates to a toroidal coil apparatus in which a plurality of coils are arranged in the torus form, and particularly to such a construction for supporting electromagnetic force.

Generally, the torus-type nuclear fusion apparatus consists, as shown in FIGS. 1 and 2, of a plurality of toroidal coils 1 each surrounding a common closed loop axis A, a vacuum container 2, air-core current transformer coils 3, and poloidal coils 4. The vacuum container 2 has a trapezoidal shape or a circular doughnut shape in cross section thereof and a plasma P is confined therein therein by the magnetic field in the toroidal direction, poloidal direction and vertical direction. The toroidal coils 1 have a circular shape or a D-shape to approximate the shape of the plasma P which is heated by an electric current produced by a voltage induced in the plasma P by changing the magnetic flux of the air-core current transformer coils 3 wound in the vicinity of the vacuum container 2.

In a toroidal magnetic field generator of the torus-type nuclear fusion apparatus, in general, heavy currents are permitted to flow in the same direction through a plurality of coils arranged on a torus circle, thereby to generate toroidal magnetic field. An intense electromagnetic force is generated in the toroidal coils owing to the interaction between the magnetic field and coil currents. The electromagnetic force works as an expanding force F to expand the coils in general, and is so distributed as to become intense toward the inner side of the torus and weak toward the outer side of the torus. Therefore, there develops a force (centripetal force) Fr which acts to collect the plurality of toroidal coils to the center as a whole. Further, heavy currents are permitted to flow into the poloidal coils installed adjacent to the toroidal coils to generate a poloidal magnetic field, thereby to heat the plasma, and to control the shape and position of the plasma. Here, the poloidal magnetic field intersects the electric currents flowing through the toroidal coils, whereby a force is generated to invert the toroidal coils outwardly at the surfaces thereof. In the torus-type nuclear fusion apparatus, a problem remains with regard to how to support the electromagnetic force generated in the toroidal coils and how to minimize the stress generated in the toroidal coils.

To cope with this problem, the conventional apparatus has been constructed as shown in FIGS. 3 to 5.

That is, as shown in FIGS. 3 and 4, the toroidal coils 1 each consisting of a conductor wound in a number of turns, are contained in coil support frames 5a, 5b consisting of straight portions 5a, and curved portions 5b connecting opposite ends of the straight portions 5a, and made of a nonmagnetic material such as SUS or a strong aluminum alloy capable of withstanding an intense electromagnetic force generated in the toroidal coils I. The coil support frames 5a, 5b are strongly fastened at their upper and lower portions to a rack 7 by bolts 8 via coil support legs 6, so as to be capable of withstanding the weights of the toroidal coils 1, heat, electromagnetic force F, centripetal force Fr, and inverting force $F_Q$. Further, wedge-like coupling portions 5c are provided to support the centripetal force Fr at positions of wedge portions 1a at the inner end portions of toroidal coils 1.

The toroidal coils 1 contained in the coil support frames 5a, 5b are arranged in a plurality of coils in a toroidal direction. Then, a force is applied to the back side of the coils using hydraulic jacks or the like with the coil support frames 5b being located on the center side, in order to collect the toroidal coils 1 in a precise radial form. Then, the coil support legs 6 are fastened and secured to the rack 7 by bolts 8 so that wedge surfaces of the wedge-like coupling portions 5c provided on the inner side of the coil support frames 5a, 5b are intimately contacted with each other, and that the centripetal force Fr is correctly received via the wedge surfaces. Further, the inverting force $F_Q$ illustrated in FIG. 6 is received by inversion preventing beams 9a, 9b which are provided between the coil support frames 5a and 5b as shown in FIG. 5. In recent years, however, an increase in the scale of the apparatus has resulted in the increased intensity of the magnetic fields and increased electromagnetic forces, making it difficult to support the centripetal force Fr and the inverting force $F_Q$. That is, efforts have been made to maintain the wedge effect against the centripetal force Fr by relying upon the wedge surfaces of the wedge-like coupling portions 5c. However, as the coils are constructed in larger sizes and the total height of the coils becomes large, it becomes difficult to maintain precision while constructing the coils. Therefore, despite the fact that the coils are pushed by hydraulic jacks and are secured by bolts 8, the pushing force Ft for the coils is effective only in the vicinities of coil support legs 6; i.e., it is no longer possible to maintain the pushing force Ft for the total height of the coils. That is, even though the coil support frames 5a, 5b at the upper and lower portions of toroidal coils 1 are pushed by jacks 11, the toroidal coils 1 undergo displacement as shown in FIG. 7. Accordingly, the pushing force is not transmitted to the central and straight portion of the coils, and the wedge effect is not obtained for the total height of the coils.

Japanese Patent Application No. 48315/1979 teaches to provide a cylinder for the straight portion of coil, and to provide a wedge mechanism between the cylinder and the coil frame. According to this method, however, the coil must be constructed in two-split construction so that the cylinder can be inserted. Furthermore, it is difficult to have the wedge mechanism work for the total height, and also it is difficult to adjust for slacks.

SUMMARY OF THE INVENTION

The present invention was accomplished in view of the above-mentioned defects, and has for its object to provide a rigid toroidal coil apparatus in which the neighboring toroidal coils are intimately coupled together over the total height of the coils to produce a wedge effect so as to be capable of withstanding strong electromagnetic forces.

BRIEF DESCRIPTION OF THE DRAWINGS

In the drawings, the same reference numerals denote the same or corresponding portions.

DESCRIPTION OF THE PREFERRED EMBODIMENT

Figure 1:
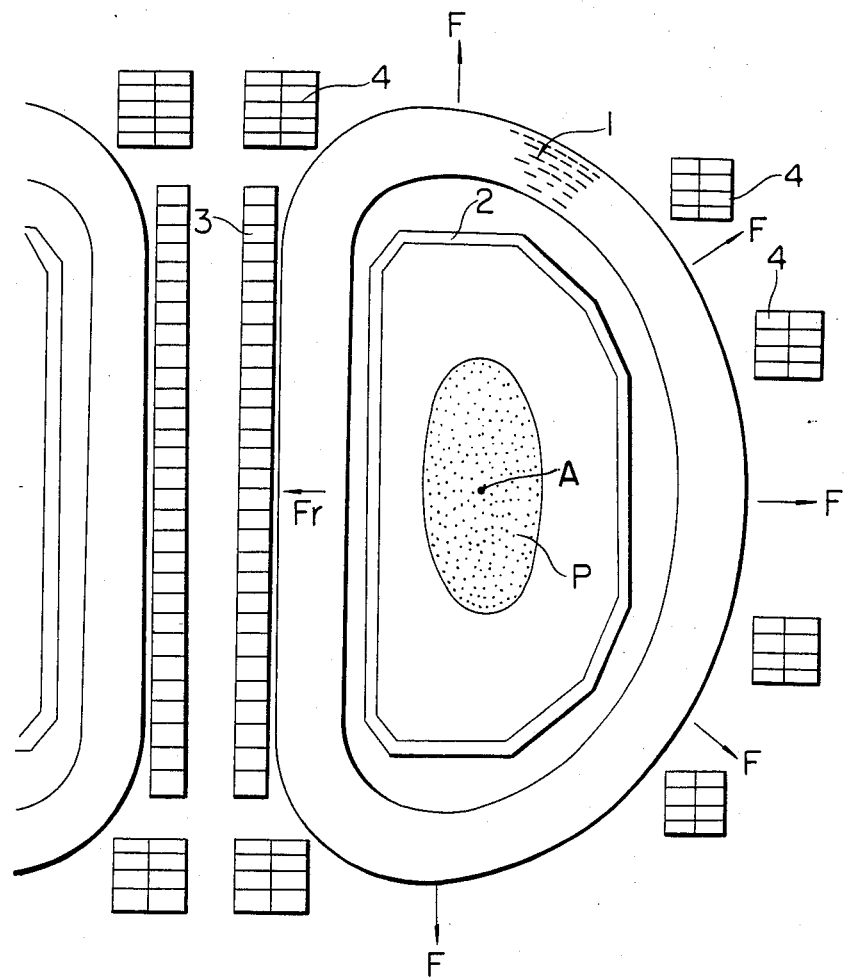
FIGS. 1 and 2 are sectional side view and a plan view schematically illustrating a conventional torus-type apparatus for nuclear fusion.
Figure 2:
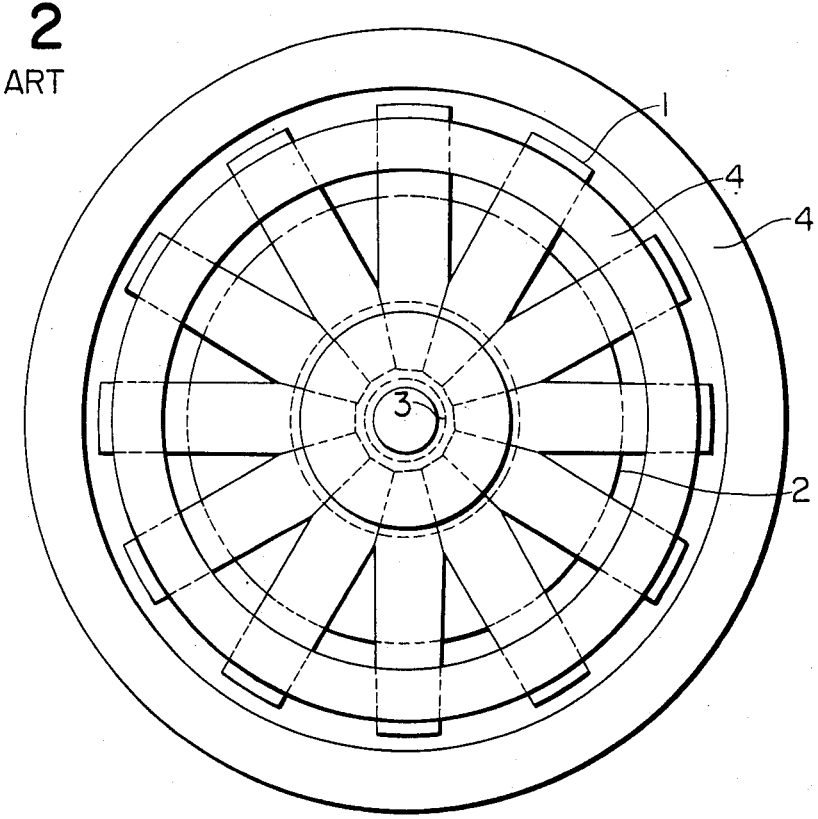
Figure 3:
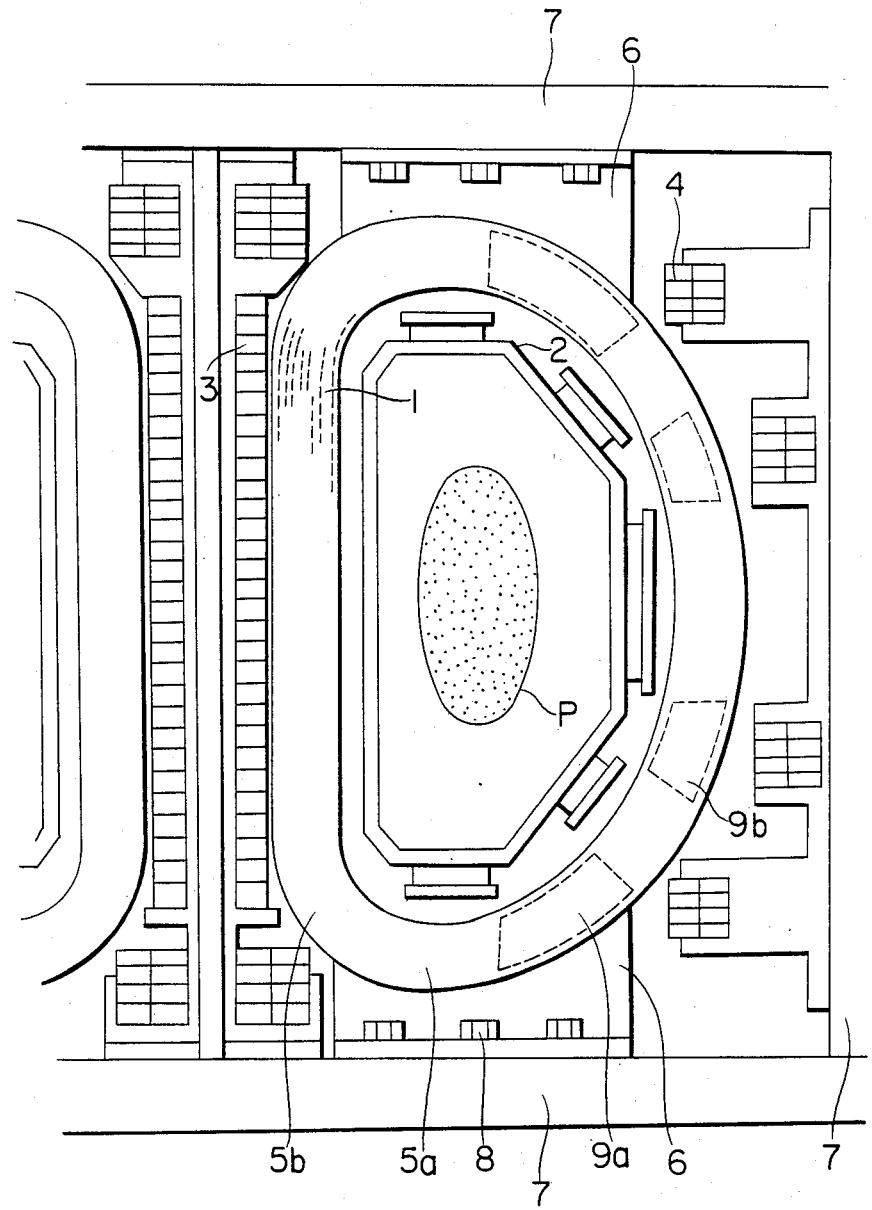
FIGS. 3 to 5 are a sectional side view showing another conventional toroidal coil apparatus, and plan views showing major portions thereof.
Figure 4:
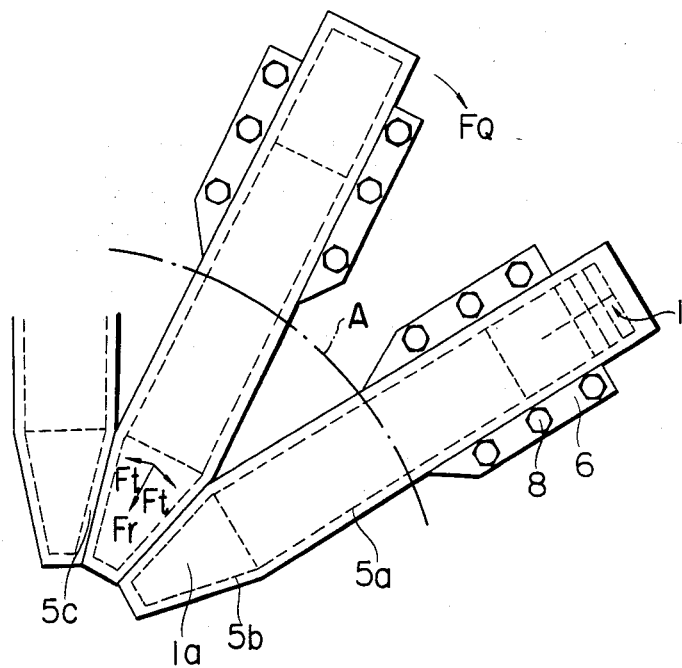
Figure 5:
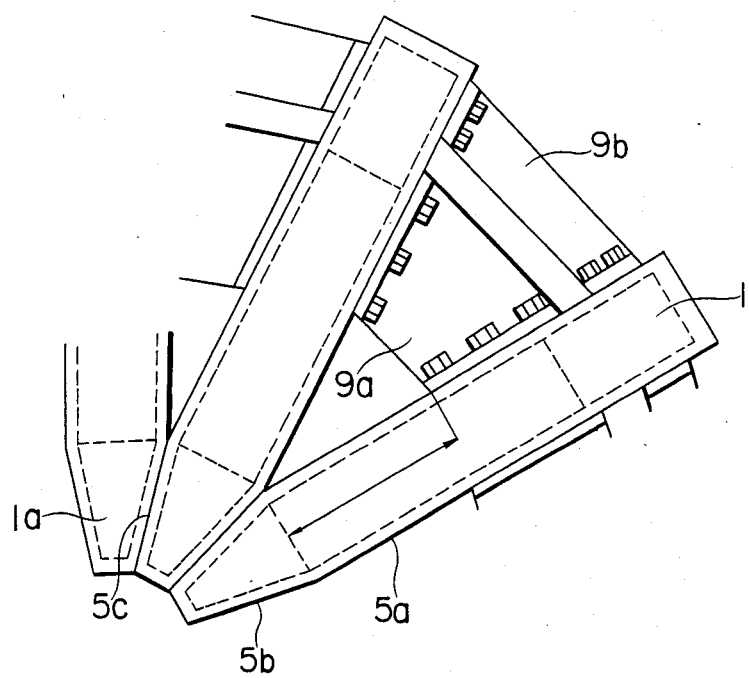
Figure 6:
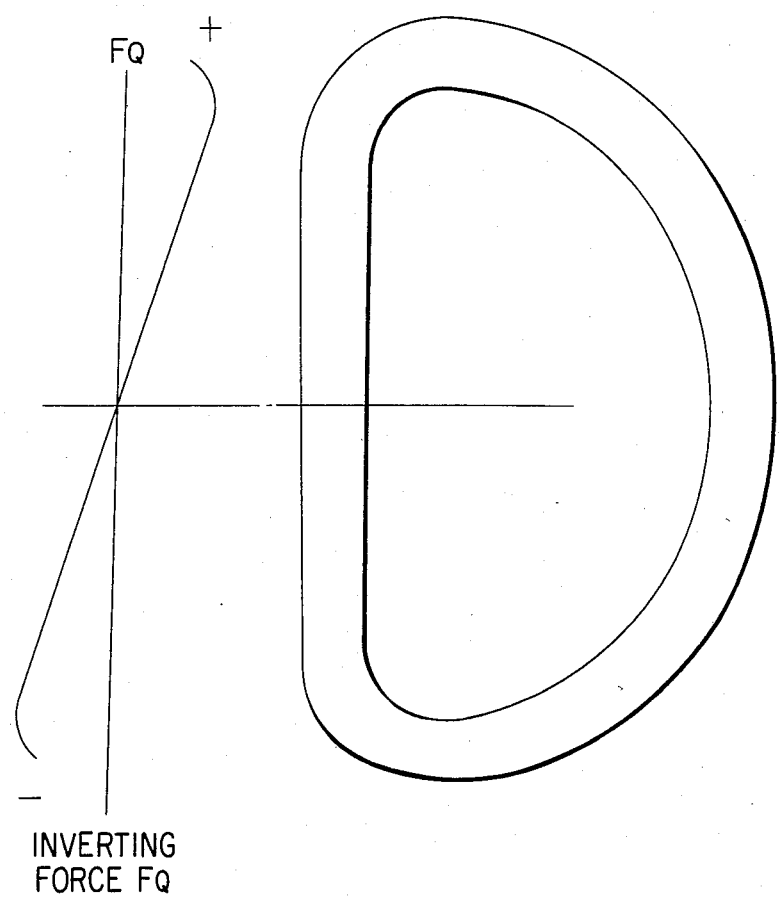
FIG. 6 is a diagram showing a pattern of an inverting force that is generated in the straight portions of toroidal coils.
Figure 7:
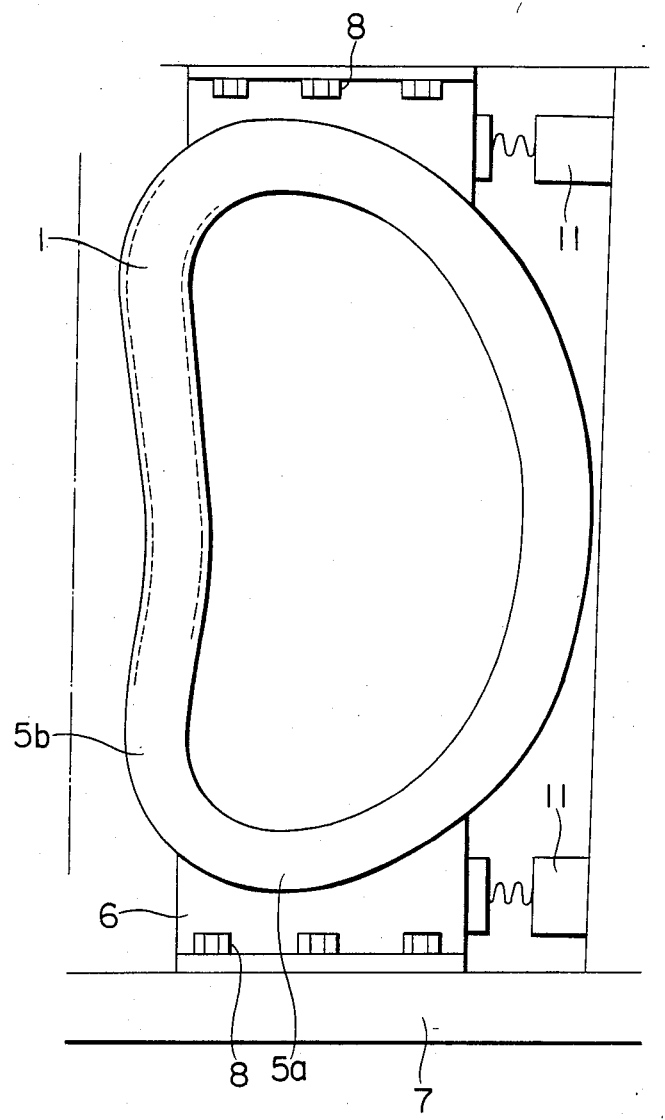
FIG. 7 is a sectional side view showing the displacement of coils caused by the electromagnetic force.
Figure 8:
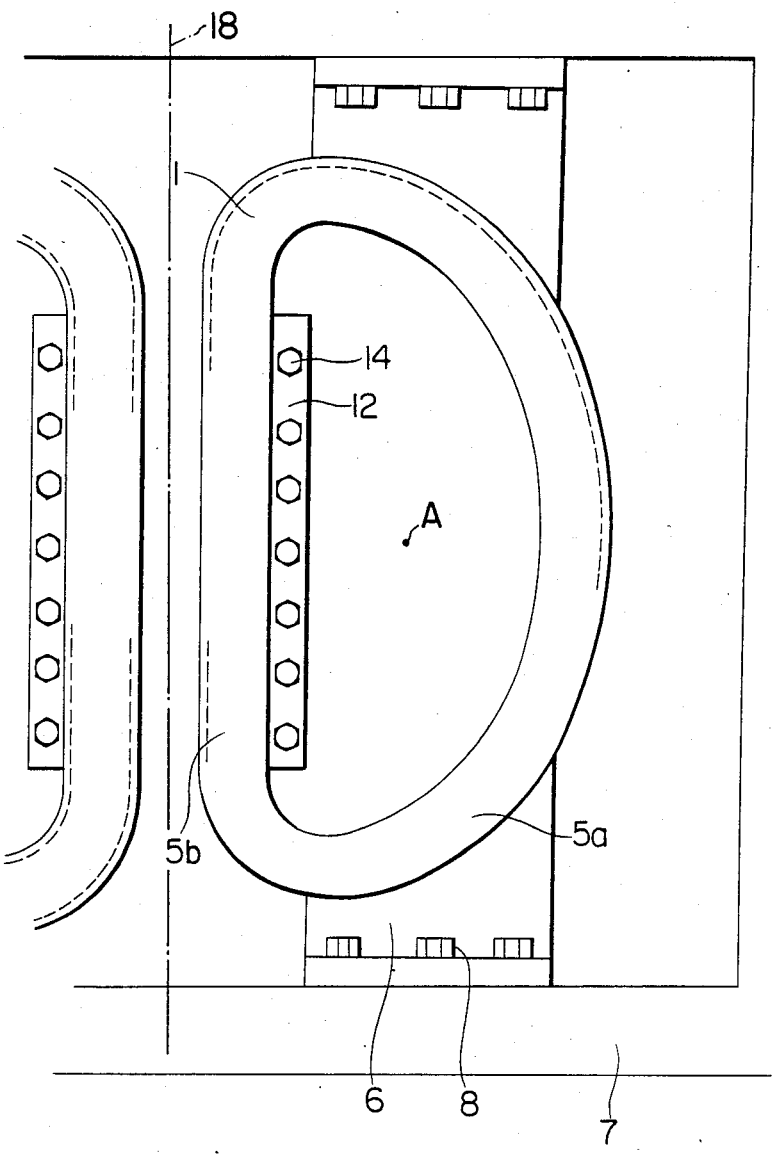
FIGS. 8 and 9 are a sectional side view showing a toroidal coil apparatus according to an embodiment of the present invention, and a plan view showing major portions thereof.
Figure 9:
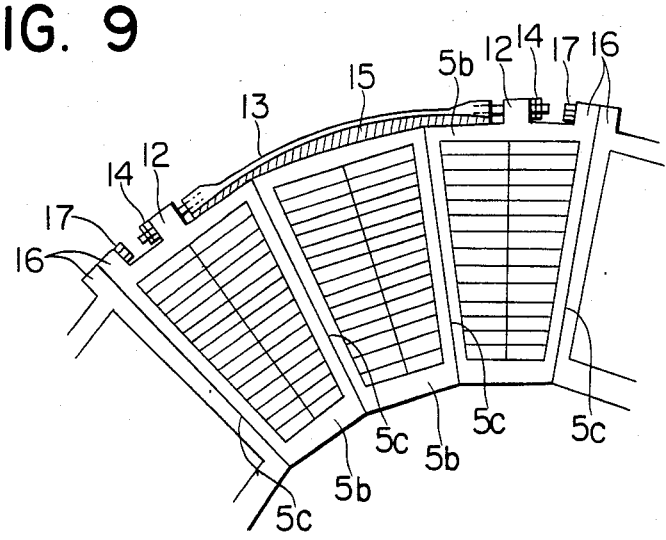

An embodiment of the present invention will be described below in conjunction with FIGS. 8 and 9. In this embodiment, three toroidal coils 1 are fastened together as a block. In the drawings, reference numeral 12 denotes flanges welded onto a straight portion 5b of the coil support frames parallel to center axis 18, on the inner side of the torus (on the radially outer side with respect to the center axis 18 of the torus) and facing the closed loop axis A. As shown in FIG. 9, the flanges 12 are provided on the circumferentially outer (opposite) sides of the two outer coil support frames. Reference numeral 13 denotes a nonmagnetic band made of, for example, SUS, aluminum or the like, which is used to fasten the neighboring coil support frames 5b together. Both ends of the band 13 are threaded and penetrate through the flanges 12. Reference numeral 14 denotes nuts that fit onto the threaded ends of the band 13 penetrating through the flanges 12, and which cause the band 13 to tighten the three coil support frames 5b together. Numeral 15 denotes a spacer composed of an epoxy resin, FRP, or the like, and which is fitted between the coil support frames 5b and the band 13 such that the coils can be effectively tightened, numeral 16 denotes a pair of coupling pieces for coupling blocks of three coil support frames 5b fastened by bands 13, and reference numeral 17 denotes bolts which fasten the pair of coupling pieces 16 to firmly secure the coil support frames 5b.

The operation of the toroidal coil apparatus of the present invention will be described herebelow.

A plurality of toroidal coils 1 are collected precisely in a radial manner on the rack 7. Wedge surfaces of wedge-like coupling portions 5c of the coil support frames 5a, 5b are intimately contacted to one another, and a force is applied using hydraulic jacks or the like from the back side of the coils so that the centripetal force Fr is correctly received via the wedge surfaces. Under this condition, the band 13 is fastened by nuts 14 so that a pushing force Ft and a frictional force is maintained on the wedge surfaces. Thus, the three coil support frames 5b produce a wedge effect over the total height of straight portion of the coils. Thereafter, another block consisting of three coil support frames 5b is fastened by the band 13, successively in the circumferential direction. Then, the pair of coupling pieces 16 are fastened by bolts 17 to secure the blocks, each consisting of three coil support frames 5b to each other. A cylinder is formed by the coil support frames 5b as a unitary structure. Thus, the individual blocks each consisting of three coil support frames 5b are fastened by the bands 13, and the coupling portions 16 are fastened by the bolts 17 to construct the coil support frames 5b in a cylindrical form as a unitary structure. Therefore, wedge surfaces of the wedge-like coupling portions 5c can be brought into intimate contact with one another precisely and over the total height of the straight portion of the coils. Accordingly, the plurality of toroidal coils 1 are firmly adhered to one another inside the torus to produce an edge effect and to maintain a frictional force among the coil support frames 5b. The pushing force Ft is generated among the coil support frames 5b, and increased rigidity is produced against the centripetal force Fr or the inverting force $F_Q$ caused by an intense electromagnetic force that is produced when the electric currents are allowed to flow through the coils. Consequently, stress exerted on the coils can be reduced.

The above-mentioned embodiment has dealt with the case in which three coil support frames 5b are fastened by the band 13 as a block. However, each block may be made up of two coil support frames 5b, or four or more coil support frames 5b being fastened together by the band 13.

According to the present invention as described above, flanges are provided on the straight portions of coil support frames inside the torus, bands are engaged with the flanges to fasten neighboring coil support frames, and the coil support frames fastened by bands are firmly coupled together by a coupling mechanism, so that the neighboring coil support frames are densely coupled together over the total height of straight portions of the coils to produce a wedge effect. Thus, the present invention provides a toroidal coil apparatus which is rigidly constructed to withstand intense electromagnetic forces.

What is claimed is:

1. A toroidal coil apparatus, comprising:
   a plurality of coil support frames, each surrounding a common closed loop axis and having electrically conductive coils therein, said plurality of coil support frames having
      respective straight inner portions parallel to and together surrounding a center axis, said straight inner portions having inner sides facing said center axis and outer sides facing said closed loop axis, and
      respective curved outer portions radially outward of said straight inner portions connecting opposite ends of respective ones of said straight inner portions, said support frames including wedge-shaped coupling portions formed on said straight inner portions wedged together about said center axis;
   flanges formed on said outer sides of said straight inner portions so as to project radially outwardly away from said center axis;
   bands extending across respective predetermined numbers of neighboring ones of said support frames along said outer sides of said straight inner portions, each of said predetermined numbers of neighboring support frames defining a respective block of said support frames, said flanges being formed on ones of said support frames at opposite circumferential ends of said blocks with respect to said center axis, said bands engaging the flanges at said opposite circumferential ends so as to fasten the support frames of each block together; and
   coupling means, disposed at said outer sides of said straight inner portions, for firmly coupling said blocks together.

2. A toroidal coil apparatus as set forth in claim 1, wherein each of said blocks consists of three of said support frames.

3. A toroidal coil apparatus as set forth in claim 1, wherein a spacer is inserted between the support frames and the band.

4. A toroidal coil apparatus as set forth in claim 3, wherein the spacer is made of an epoxy resin.

5. A toroidal coil apparatus as in claim 1, wherein said coupling means comprises coupling members protruding radially outwardly from said center axis from said outer sides of said straight inner portions of said support frames at said opposite circumferential ends of said blocks, and bolts penetrating neighboring ones of said coupling members of neighboring ones of said blocks so as to firmly secure said neighboring coupling members together.

* * * * *